United States Patent [19]

Steinberger et al.

[11] Patent Number: 4,524,172
[45] Date of Patent: Jun. 18, 1985

[54] PREPARATION OF AQUEOUS SILICONE DISPERSIONS FOR TREATING TEXTILES

[75] Inventors: Helmut Steinberger; Helmut Kirschnek; Josef Pfeiffer, all of Leverkusen, Fed. Rep. of Germany

[73] Assignee: Bayer Aktiengesellschaft, Leverkusen, Fed. Rep. of Germany

[21] Appl. No.: 550,834

[22] Filed: Nov. 14, 1983

[30] Foreign Application Priority Data

Dec. 4, 1982 [DE] Fed. Rep. of Germany ....... 3244955

[51] Int. Cl.$^3$ .......................... C08K 5/01; C08L 83/06
[52] U.S. Cl. ................................... 524/506; 524/475; 524/588; 106/287.14
[58] Field of Search ............... 524/265, 506, 475, 588; 106/287.14, 270; 252/8.7, 8.9

[56] References Cited

U.S. PATENT DOCUMENTS 4,380,451  8/1983  Steinberger ..................... 252/8.9

FOREIGN PATENT DOCUMENTS 11261784  1/1972  United Kingdom .

Primary Examiner—C. Warren Ivy
Attorney, Agent, or Firm—Sprung Horn Kramer & Woods

[57] ABSTRACT

An aqueous dispersion approximately comprising by weight
(A) 1-30 parts by weight of a polyether-siloxane, crosslinked via alkylenoxy bridges, of the general formula

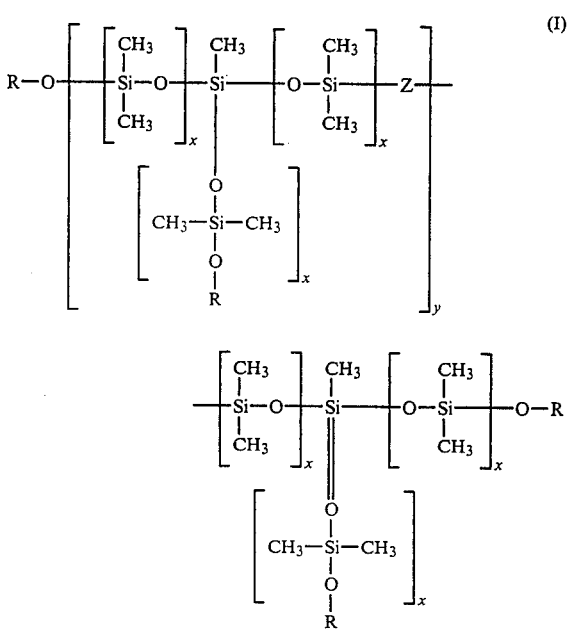

in which
Z is divalent alkylenoxy radical with 2–8 C atoms,
R is a polyether radical,
x is an integer between 2 and 25, and
y is an integer between 1 and 9,
(B) 1–40 parts of a high-molecular polyethylene with an average molecular weight of above 15,000–50,000,
(C) 1–10 parts of an anionic emulsifier,
(D) 0–15 parts of a non-ionic emulsifier, and
(E) 2–97 parts of water.

has been found to be particularly stable and useful in the finishing of textiles.

6 Claims, No Drawings

PREPARATION OF AQUEOUS SILICONE DISPERSIONS FOR TREATING TEXTILES

The present invention relates to storage-stable and heat-stable aqueous dispersions on a silicone basis, the preparation of these dispersions by an emulsifying process and, furthermore, the use of such dispersions as agents for treating textiles. The present invention relates to aqueous dispersions containing (A) 1–30 parts by weight of a polyether-siloxane, crosslinked via alkylenoxy bridges, of the general formula

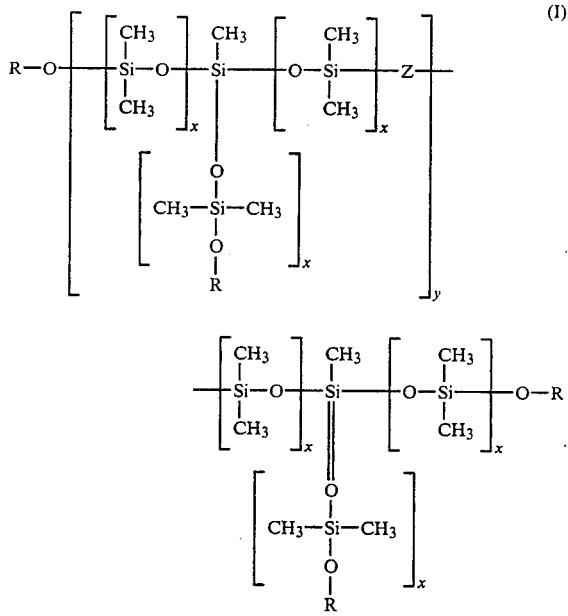

wherein
Z represents a divalent alkylenoxy radical with 2–8 C atoms, preferably the butylenoxy radical,
R represents a polyether radical,
x represents a value between 2 and 25 and
y represents a value between 1 and 9, (B) 1–40 parts by weight of a high-molecular polyethylene with an average molecular weight of 15,000–50,000,
(C) 1–10 parts by weight of an anionic emulsifier,
(D) 0–15 parts by weight of a non-ionic emulsifier and
(E) 2–97 parts by weight of water.

The present invention furthermore relates to a process for the preparation of the aqueous dispersions as described, which is characterized in that a mixture consisting of 8–90% by weight of a crosslinked polyether-siloxane of the formula I, 0.1–18% by weight of anionic and, if appropriate, non-ionic emulsifiers and 1–92% by weight of water is added to an aqueous polyethylene dispersion containing 5–40% by weight of polyethylene and 1–10% by weight of anionic emulsifiers, and if appropriate also 1–15% by weight of non-ionic emulsifiers.

The dispersions are prepared according to the invention at temperatures of 20°–60° C. by procedure (a) or (b): according to (a) by taking an aqueous polyethylene dispersion containing 5–40% by weight of polyethylene and 1–10% by weight of anionic emulsifiers, and, if appropriate, also 1–15% by weight of non-ionic emulsifiers, and slowly adding, with continuous stirring, a mixture or an emulsion composed of 8–90% by weight of a crosslinked . polyether-siloxane of the general formula I, 0.1–18% by weight of anionic and, if appropriate, non-ionic emulsifiers and 1–92% by weight of water; or, vice versa, according to (b), by taking a mixture or emulsion consisting of 8–90% by weight of a crosslinked polyether-siloxane of the general formula I, 0.1–18% by weight of anionic and, if appropriate, non-ionic emulsifiers and 1–92% by weight of water and slowly stirring into this an aqueous polyethylene dispersion containing 5–40% by weight of polyethylene and 1–10% by weight of anionic emulsifiers, and, if appropriate, also 1–15% by weight of non-ionic emulsifiers.

The mixing ratio of the emulsifier-containing polyethylene dispersion and the emulsifier-containing polyether-siloxane component can vary within the abovementioned limits, depending on the envisaged end use.

For most practical applications as agents for treating textiles, concentrates of the dispersions containing between 5 and 30% by weight of polyether-siloxane and between 5 and 40% by weight of high-molecular polyethylene can be used.

While the dispersions according to the invention advantageously must always contain the anionic emulsifier, non-ionic emulsifier contents are only necessary if, when the dispersions are used in practice, the liquors used are required to have a high resistance to salt.

The dispersions which can be prepared in this manner have a milky-white appearance and an average particle diameter of 80–800 mµ. They have an unexpectedly high storage stability of 1–2 years at temperatures of 10°–45° C., which, as is known, must be regarded as being very unusual for silicone-containing dispersions.

The polyether-siloxane copolymers which can be used in the context of the invention correspond to the general formula I. These are polyether-siloxanes linked via butylenoxy bridges. They are prepared by the process described in DE-OS (German Published Specification) No. 2,802,668, by reaction of the corresponding acyloxypoly-siloxanes of the formula

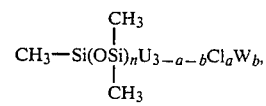

wherein
W denotes a $C_4F_9SO_3$ radical,
U denotes a radical of a lower monobasic carboxylic acid with up to 4 C atoms, preferably an acetate radical,
n is a number between 3 and 80, preferably a number between 6 and 30,
a is equal to or less than 1 and
b is equal to or less than 0.5,
and wherein
a+b is equal to or less than 1,
with polyethers which are started from monohydric alcohols, preferably butanol, and comprise ethylene oxide and propylene oxide units in alternating sequence.

The degree of branching is controlled at the same time as the linking of the siloxane and polyalkylene oxide blocks by mixing the monofunctional polyoxyalkylene blocks with difunctional compounds in calculated proportions and at the same time carrying out the reaction with the chosen polyorganopolysiloxane in an organic solvent in the presence of a proton-trapping agent.

The choice of possible polysiloxane-polyoxyalkylene compounds of the formula I largely depends on the intended end use during finishing of textiles.

If, for example, preferably hydrophilic, antistatic finishing effects are desired, a polyether-siloxane copolymer according to the formula I with a polyether radical of the formula $$C_mH_{2m+1}[C_2H_4O]_x[C_3H_7O]_y—$$

wherein
- m preferably denotes 1 to 4,
- X denotes a number from 15 to 40, preferably from 20 to 30, and
- Y denotes a number from 5 to 25, preferably from 8 to 15, is chosen.

On the other hand, polyether-siloxane copolymers of the formula I with a polyether radical of the above formula wherein
- m denotes 2 to 12, preferably 4 to 8,
- X denotes a number from 0 to 25, preferably from 0 to 15, and
- Y denotes a number from 5 to 40, preferably from 10 to 30, are suitable for improving the sewability of the finished textiles.

The aqueous high-molecular polyethylene dispersions which can be used in the context of the present invention are generally known in the finishing of textiles and are employed, for example, in crease-proofing (compare, for example, European Pat. No. 518,917, Belgian Pat. No. 618,648 and Lindner "Tenside-Textil-hilfsmittel-Waschrohstoffe" ("Surface-Active Agents - Textile Auxiliaries - Detergent Bases"), 2nd Edition (1964), Volume 1, page 63).

These primary dispersions are prepared on a large industrial scale by direct emulsion polymerization of the ethylene under increased pressure and in the presence of anionic and, if appropriate, non-ionic emulsifiers.

Examples of customary anionic emulsifiers are the alkali metal salts of alkylsulphonic acids, of alkylbenzenesulphonic acids and of higher fatty acids. The sodium salt of dodecylsulphonic acid is preferably used.

Alkyl-polyethers or alkyl-aryl-polyethers, such as, for example, the polyethers of dodecylalcohol or nonylphenol with 7–20 mols of ethylene, are particularly suitable as non-ionic emulsifiers which are additionally employed, if appropriate.

Customary, commercially available polyethylene primary dispersions are preferably used in the context of the preparation according to the invention. Their solids content is 30–45%, the average molecular weight of the polyethylene is between 15,000 and 50,000 and the average particle diameter is between 80 and 800 m$\mu$.

The above statement of the solids content includes the emulsifier portion of about 2–10% by weight.

Possible emulsifiers which can be used for the preparation of the silicone/polyethylene/water dispersions are both anionic and non-ionic known surface-active compounds Water-soluble or substantially water-soluble products are preferably employed.

Examples of the group of possible non-ionic emulsifiers, are the known ethoxylation products of fatty alcohols, fatty acids, fatty acid amides, fatty acid sorbitan esters and alkylphenols, such as (a) polyoxyethylene-(7) n-dodecyl ether, polyoxyethylene-(10) n-dodecyl ether, polyoxyethylene-(10) n-octadecyl ether and polyoxyethylene-(20) n-octadecenyl ether;

(b) polyoxyethylene-(7) laurate, polyoxyethylene-(10) myristate, polyoxyethylene-(20) stearate and polyoxyethylene-(30) oleate;

(c) polyoxyethylene-(20)-stearylamide;

(d) polyoxyethylene-(10) sorbitan monolaurate, polyoxyethylene-(15) sorbitan monostearate, polyoxyethylene-(20) sorbitan dioleate and polyoxyethylene-(30) sorbitan trioleate; and (e) nonyl-phenoxy polyethylene glycol-(7), nonyl-phenoxy polyethylene glycol-(10), nonyl-phenoxy polyethylene glycol-(20) and dodecyl-phenoxy polyethylene glycol-(30); and mixtures of (a) to (e).

Examples of the group of possible anionic emulsifiers are the alkali metals or amine salts of alkylsulphonic acids, alkanolsulphuric acid half-esters, arylsulphonic acids, alkylarylsulphonic acids or dialkylarylsulphonic acids, such as the sodium or amine salts of dodecylsulphonic acid, octadecylsulphonic acid, dodecanolsulphuric acid half-ester, octadecenyl-sulphuric acid half-ester, naphthalenesulphonic acid, dodecylbenzenesulphonic acid and dibutyl-naphthalenesulphonic acid.

The choice of suitable emulsifiers in each case depends on the polyether-siloxane component to be emulsified and on the particular emulsifier contents already present in the polyethylene dispersion (in the case of their large-scale preparation).

If, for example, a polyethylene dispersion which has been prepared using dodecyl sulphate as the dispersing agent is used as the starting material, it is advantageous also to use dodecyl sulphate as the anionic emulsifier for pre-emulsification of the polyether-siloxane component.

In the preparation of the polyether-siloxane preemulsion, it is advantageous also to add one or more non-ionic emulsifiers in addition to the anionic emulsifiers. The latter measure ensures a better resistance to salts of the silicone/polyethylene/water dispersions when these are used in practice in the finishing of textiles.

Examples of some emulsifiers which are advantageously suitable for the process according to the invention are given below:

Na dodecyl-sulphate, Na dodecylsulphonate and Na dodecylbenzenesulphonate as anionic emulsifiers, and, as non-ionic emulsifiers, polyoxyethylene-(10) dodecyl ether, polyoxyethylene-(20) octadecyl ether, nonyl-phenoxy polyethylene glycol-(7), nonyl-phenoxy polyethylene glycol-(10) and nonyl-phenoxy polyethylene glycol-(20).

The amounts of the emulsifiers mentioned used in each case largely depend on the amounts of polyether-siloxane and polyethylene to be emulsified. A total of 1–15 parts by weight of anionic and, if appropriate, non-ionic emulsifiers is sufficient for 100 parts by weight of polyether-siloxane or polyethylene (solid substance) to be emulsified.

Amounts which may be mentioned by way of example are 3 parts by weight of anionic and, if appropriate, 10 parts by weight of non-ionic emulsifiers for 100 parts by weight of polyether-siloxane, and 7 parts by weight of anionic and, if appropriate, 7 parts by weight of non-ionic emulsifers for 100 parts by weight of polyethylene.

The exact amounts can easily be determined from case to case by preliminary experiments.

The silicone/polyethylene/water dispersions are prepared by slowly mixing the emulsifier-containing aqueous pre-emulsion of the crosslinked polyether-siloxane with the emulsifier-containing aqueous dispersion of the high-molecular polyethylene at temperatures of 20°–60° C., by, as described above in more detail, either, according to (a), taking the emulsifier-containing aqueous pre-emulsion of the polyether-siloxane and allowing the emulsifier-containing aqueous polyethylene dispersion to run in slowly, with continuous stirring, or, vice versa, according to (b), by taking the emulsifier-containing aqueous polyethylene dispersion and allowing the emulsifier-containing aqueous polyether-siloxane pre-emulsion to run in slowly.

In this procedure, the concentration (based on the solid) of the two aqueous pre-emulsions or dispersions to be mixed is not critical as long as the emulsions or dispersions are still mobile and readily stirrable.

No special stirring devices or homogenizers are required in the process, which must be regarded as a particular advantage.

The stable silicone/polyethylene/water dispersions obtained in this manner can be diluted to any desired concentration, for example for the preparation of stock solutions for use in practice, by slowly stirring in further amounts of water. The upper concentration limit for silicone/polyethylene/water dispersions which are still pourable is about 55% (weight/) of the total amount of polyether-siloxane and polyethylene.

On the basis of their very special structure, the crosslinked polyether-siloxanes described above combine several advantageous properties within themselves for their use according to the invention:

In contrast to the methyl-polysiloxanes at present customary in textile finishing, they can be emulsified in water without special mechanical devices (for example homogenizing machines) and advantageously combined with polyethylene dispersions in that the polyether-siloxanes exert an additional stabilizing effect on the highly disperse polyethylene particles. Surprisingly, silicone/polyethylene/water dispersions which are very stable to storage and heat are obtained, the storage times being 1–1.5 years in the temperature range from 10° to 45°.

The polyether-siloxane pre-emulsion is advantageously prepared by taking an aqueous emulsifier solution containing 1–15 parts by weight of anionic and, if appropriate, non-ionic emulsifiers per 100 parts by weight of polyether-siloxane to be emulsified, and allowing the liquid polyether-siloxane to run in slowly at temperatures of 20°–60° C., with stirring. A substantially clear to slightly turbid pre-emulsion is obtained, the viscosity of which can vary between mobile and pasty, depending on its water content.

The commercially available primary dispersions, prepared on a large industrial scale, of high-molecular polyethylenes which have already been described in detail above, can be employed as the polyethylene dispersions which can be used according to the invention. Experience shows that their solids content is 30–40%, including the emulsifier content.

The aqueous silicone/polyethylene/water dispersions according to the invention can additionally also contain small amounts of antibacterial agents against possible bacterial infection, for example 0.1% of a formalin solution.

The polyether-siloxane-/polyethylene dispersions according to the invention are very advantageously suitable in many ways in the finishing of textile woven fabrics and of knitted fabrics and in the dyeing and whitening of these fabrics.

Some advantageous uses may be mentioned below by way of example.

When they are used by the padding method as softening agents and agents which improve the handle in the after-treatment of textile materials of cellulose fibers and/or synthetic fibers, they combine the advantages of agents based on polydimethylsiloxane, such as good smoothness, stability to heat and a low tendency to yellowing, with the known advantages of softening agents based on natural fats, such as high fullness, absorbency and adequate antistatic properties, without having the known disadvantages of these classical softening agents, such as hydrophobic properties, inadequate permeability to water vapor and antistatic properties, deficient fullness of hand (impoverished hand) on the one hand and instability to heat, marked tendency towards yellowing, an adverse influence on whitener effects and, in the case of disperse dyeings on polyesters, increased migration under heat on the other hand.

In the finishing of elastomeric fiber material (for example in foundation garments), the agents according to the invention additionally impart to the goods, in addition to smooth, full effects and sufficient hydrophilic properties, improved technological data, for example in respect of extensibility and relaxation properties, which means that, overall, improved supporting properties are achieved.

Advantages which are to be particularly singled out are, for the expert, a substantial improvement in the sewability of the goods provided with the finish, in respect of a lowering of the needle temperatures and the puncture force with simultaneous improvement in smoothness and hand (softness).

A reduction in the electrostatic charge caused by friction, that is to say improved antistatic properties, of the textile materials provided with the finish is also remarkable.

The use of the dispersions according to the invention as textile softeners which are stable to heat permits short drying times and hence a practical procedure. For example, drying of polyester woven fabrics can be carried out at 180° C. in the course of 30 seconds.

The products according to the invention are furthermore outstandingly suitable for use as softening agents for one-bath application in the dyeing or whitening of textile materials. For example, whereas the fastness properties of disperse dyeings on polyester are greatly impaired by softening agents based on fats because of thermomigration, the agents according to the invention have only a comparatively slight influence on thermomigration in the case of these dyeings.

A surprising effect is also achieved in one-bath use as a softening agent in the context of whitener application. Whereas it is known that products based on fats significantly decrease the degree of whiteness here, the polyether-siloxane-/polyethylene dispersions according to the invention effect a clearly measurable increase in the degree of whiteness on polyester, as well as improving the hand and hydrophilic properties.

The examples which follow are intended to illustrate the invention in more detail, without restricting it in its scope. Unless indicated otherwise, percentages are by weight.

EXAMPLE 1

(Preparation example for a treatment agent according to the invention)

(a) Preparation of a polyether-siloxane 18 g (0.06 mol) of perfluorobutanesulphonic acid and then 3,996 g (13.5 mols) of octamethylcyclotetrasiloxane are added to 297 g (2 mols) of methyltrichlorosilane. The mixture is then heated to 90° C., and 800 g (13.4 mols) of acetic acid are added in the course of 2 hours. During the addition, the mixture is heated up further, so that a temperature of 130° C. is reached when addition is complete (stream of HCl exhausted). The mixture is then stirred at 130° C. for 2 hours.

The product is subsequently heated thoroughly at 130° C. under 67 mbar.

Yield: 4,000 g Acetate: 137 m equivalents/100 g

The product obtained according to the above description is reacted further in the following manner:

500 g (=1.02 equivalents of acetate) of an acetoxypolysiloxane with n=27 dimethylsiloxy units are stirred with 2,000 g of dried toluene. A mixture consisting of 1,477.3 g (0.79 equivalent) of polyether (with a molecular weight of 1,870, an ethylene oxide content of 45% and a prolyene oxide content of 55%, 10% of the proylene oxide contained in the molecule being as a block on the end of the molecular chain started from butanol, and the remainder being in random distribution together with the stated ethylene oxide content), 10.35 g (0.23 equivalent) of 2,3-butanediol and 1,500 g of dried toluene is added to the mixture at room temperature in the course of 15 minutes.

Without heating, 17.34 g of dried $NH_3$ are passed in to saturation (at about 8.67 g/hour) in the course of about 2 hours. The mixture is then heated to 70° C. in the course of 30 minutes, during which the stream of ammonia is increased to 11.9 g/hour. Stirring is continued for 90 minutes and the mixture is then cooled slowly. The stream of $NH_3$ is stopped 30 minutes after the start of the cooling phase.

The solution, which is very turbid as a result of salts, is filtered and the solvent is evaporated off from the filtrate by heating at a maximum of 100° C. under 20 mbar. A clear, slightly yellow-colored residue is obtained.

Yield: 1,978.5 g Viscosity: 640 mpa.s $n_D^{20}=1.4475$ (b) Preparation of the polyether-siloxane emulsion A clear solution of 3 g of Na dodecylsulphonate and 270 g of water is warmed to about 60°-65° C. and 100 g of the polyether-siloxane of (a) is poured into the liquid, with the stirrer switched off, such that the wall of the stirred vessel is not wetted by the siloxane. The mixture is then stirred at a slow speed for about 15 minutes and the resulting turbid emulsion is then cooled to 20° C., with stirring.

(c) Preparation of the treatment agent 248 g of water (salt-free) is allowed to run, at a temperature of 20°-25° C., into 373 g of a polyether-siloxane emulsion, the preparation of which is described above and which is composed of 26.8% by weight of the polyether-siloxane described above, 0.8% by weight of Na dodecylsulphonate and 72.4% by weight of water. During the addition of water, the mixture is stirred at a slow speed.

377 g of a polyethylene dispersion containing 35% by weight of a polyethylene (average molecular weight 30,000), 2.5% by weight of Na dodecylsulphonate and 1.5% by weight of nonylphenoxy polyethylene glycol-(10) are now allowed to run into the resulting, slightly turbid emulsion at 20°-25° C. with further slow stirring. After a stirring time of 30 minutes, a mobile, milky-white dispersion is obtained. A storage test over 1 year at a storage temperature of 20°-30° C. shows no separation or creaming of the dispersion. The dispersion can be diluted with water, even after this storage time.

The polyethylene dispersion employed is a commercially available dispersion for crease proofing.

EXAMPLE 2

(Preparation example for a treatment agent according to the invention)

(a) Preparation of a polyether-siloxane 9 g (0.03 mol) of perfluorobutanesulphonic acid and then 2,220 g (7.5 mols) of octamethylcyclotetrasiloxane are added to 149.5 g (1 mol) of methyltrichlorosilane. The mixture is then heated to 90° C. and 450 g (7.5 mols) of acetic acid are added in the course of 2 hours. During the addition, the mixture is heated up further, so that a temperature of 130° C. is reached when the addition has ended (HCl stream exhausted). The mixture is then stirred at 130° C. for a further 2 hours.

The reaction product is heated thoroughly at 130° C. under 67 mbar.

Yield: 2,250 g Acetate: 123 m equivalents/100 g

The product obtained according to the preceding description is further reacted in the following manner.

500 g (=0.61 equivalent of acetate) of an acetoxypolysiloxane with n=30 dimethylsiloxy units are mixed with 2,000 g of dried toluene, and a mixture consisting of 667 g (0.38 equivalent) of polyether (with a molecular weight of 1,760, an ethylene oxide content of 42% and a propylene oxide content of 58%, the ethylene oxide contained in the molecule being as a block at the end of the molecular chain, which is started from butanol, and the propylene oxide content following this as a block on the end of the hydroxyl group), 10.35 g (0.23 equivalent) of 2,3-butanediol and 1,500 g of dried toluene is added to this mixture in the course of 15 minutes. Without heating, 17.4 g of dried $NH_3$ are passed in to saturation (at about 8.7 g/hour) in the course of about 2 hours. The mixture is then heated to 70° C. in the course of 30 minutes, during which the stream of ammonia is increased to about 12 g/hour. Stirring is continued for a further 90 minutes and the mixture is then cooled slowly. The stream of $NH_3$ is switched off 30 minutes after the start of the cooling phase.

The solution, which is very turbid as a result of salts, is filtered and the solvent is evaporated off from the filtrate by heating at a maximum of 100° C. under 20 mbar. A clear, slightly yellow-colored residue is obtained.

Yield: 1,140 g Viscosity: 1,330 mPa.s $n_D^{20}=1.4474$ (b) Preparation of the polyether-siloxane emulsion A clear solution of 3 g of Na dodecylsulphonate and 270 g of water is heated to about 60°-65° C. and 100 g of the polyether-siloxane from (a) are poured into the liquid, with the stirrer switched off, so that the wall of the stirred vessel is not wetted by the siloxane. The mixture is then stirred at a slow speed for about 15 minutes and the resulting turbid solution is then cooled to 20° C., with stirring.

(c) Preparation of the treatment agent

The treatment agent is prepared by a process analogous to that described in Example 1.

248 g of water are added to 377 g of a polyethylene dispersion, the composition of which is given in Example 1 (c), at 20°–30° C., with slow stirring. 373 g of a polyether-siloxane emulsion, the composition of which can be seen from Example 1 (b), are now allowed to run slowly into the resulting milky-white dispersion at 20°–30° C., with further slow stirring.

The milky-white dispersion thus obtained likewise has the high storage stability described in Example 1.

EXAMPLE 3

(Preparation example for a treatment agent according to the invention)

(a) Preparation of a polyether-siloxane 0.79 kg (5.28 mols) of methyltrichlorosilane, 22.2 kg (75 mols) of octamethylcyclotetrasiloxane and 70 g of perfluorobutylsulphonic acid are introduced into a vessel and warmed to 60° C. From 60° C., 4.2 kg (70 mols) of acetic acid are added in the course of one hour. When addition of acetic acid has ended, the contents of the kettle are heated up to a bottom temperature of 125° to 130° C.

Stirring is then continued at this temperature for 5 hours. Thereafter, the reaction mixture is cooled to below 50° C. and the pressure is carefully reduced to 50 mbar. The low-boiling components contained in the reaction mixture are now evaporated off by heating up to a bottom temperature of at most 135° C. under a final vacuum of about 20 mba.

Yield: about 22 kg of transparent product with a viscosity of about 50 mPa.s Acetate: 67.5 m equivalents/100 g The product obtained according to the above description is reacted further in the following manner:

15 kg of the resulting acetoxysiloxane are introduced into a kettle together with 15 kg of toluene. A mixture of 18.8 g of a polyether started from butanol (with a molecular weight of 1,820, an ethylene oxide content of 15% and a propylene oxide content of 85%, the total ethylene oxide content immediately following the starter molecule as a block unit) and 25 kg of toluene is prepared separately at room temperature and is allowed to run into the mixture first introduced in the course of about 15 minutes, with vigorous stirring. 172 g of $NH_3$ are then passed in over a period of 45 minutes (325 liters /hour). The mixture is now warmed to 80° C. When this temperature is reached, 90 g of propane diol are added to the reaction mixture and stirring is continued at 80° C. for 3 hours, during which time $NH_3$ is passed in to saturation of the reaction mixture.

The product is cooled to room temperature, the solution, which is turbid as a result of salts, is filtered, and the solvent is distilled off from the filtrate at a maximum of 100° C. under 20 mbar. A clear, slightly yellow-colored residue is obtained.

(b) Preparation of a polyether-siloxane emulsion

A clear solution of 3 g of Na dodecylsulphonate and 270 g of water is warmed to about 60°–65° C. and 100 g of the polyether-siloxane from (a) are poured into the liquid, with the stirrer switched off, such that the wall of the stirred vessel is not wetted by the siloxane. The mixture is then stirred at a slow speed for about 15 minutes and the resulting turbid emulsion is subsequently cooled to 20° C., with stirring.

(c) Preparation of the treatment agent 248 g of water are added to 377 g of polyethylene dispersion, the composition of which is given in Example 1 (c), at 20°–30° C., with slow stirring. 373 g of the polyether-siloxane emulsion described above are now allowed to run into the resulting milky-white dispersion at 20°–30° C., with further slow stirring.

The milky-white dispersion thus obtained likewise has the high storage stability described in Example 1.

EXAMPLE 4

(a) Preparation of a polyether-siloxane according to Example 1

(b) Preparation of the polyether-siloxane emulsion

A clear solution of 6 g of Na dodecylbenzenesulphonate and 117 g of water is warmed to about 60°–65° C. and 250 g of the polyether-siloxane from Example 1 (a) are stirred into the liquid, with the stirrer switched off, such that the wall of the stirred vessel is not wetted by the siloxane. Stirring is then continued at a slow speed for about 15 minutes and the resulting turbid emulsion is then cooled to 20° C.

(c) Preparation of the treatment agent 373 g of the polyether-siloxane emulsion described above is allowed to run into 627 g of a polyethylene dispersion, the composition of which is described in Example 1 (c) at 20°–30° C. with slow stirring and without further addition of water.

A viscous, milky-white dispersion with good storage stability is obtained.

EXAMPLE 5

(imparting handle)

Various fiber substrates (cellulose fibers, polyester fibers, polyamide fibers, wool and a blend of polyester/-wool (65–35)) were provided with a finish by two different methods of application:

(A) by the padding method (10–30 g of finishing agent/-liter, liquor pick-up: 70 to 100%, pH value of the liquor: 5–7, liquor temperature: 20° to 40° C.)

(B) application from a long liquor (exhaustion method) (liquor ratio: 1:8 to 1:30, 1–3% of finishing agent (based on the dry fiber weight), pH value of the liquor: 5–7, exhaustion time: 15–20 minutes, temperature: 30°–40° C.)

For comparison purposes, a commercially available silicone softener based on polymethylsiloxane and/or a commercially available softener based on a fatty acid amide was used, the amounts used in each case being chosen so that the application liquors contained the same amounts of finishing agents - based on their dry weight.

After the application, the fiber substrate was dried at temperatures between 80° and 120° C. and then placed under climatically controlled conditions of 65% relative humidity and 23°.

Thereafter, test pieces were cut out of the fiber substrate for the individual test methods.

The handle effect (softness, volume, smoothness) was evaluated by direct comparison of two or more test pieces against a blank sample or against a standard, the softer substrate of each pair being selected in the subjective pair comparison method, use of 1 to 5 being made.

The softest substrate is characterized by 1 and the roughest by 5. This classification is made on the same samples by at least 5 appropriately trained persons.

Table 1 which follows documents the result of the test:

TABLE 1

Handle effect after padding and exhaustion application

| Padding finishing Agent of Example 20 g/liter 80% liquor pick-up | Cellulose | Polyamide | Polyester | Polyester/Wool (65:35) | Exhaustion method 3%; Liquor 1:20 | Cellulose | Polyamide | Polyester | Polyester/Wool (65:35) |
|---|---|---|---|---|---|---|---|---|---|
| 1 | 2 | 1 | 1 | 2 | 1 | 3 | 1 | 1 | 3 |
| 2 | 2 | 1 | 1 | 2 | 2 | 3 | 1 | 1 | 3 |
| 3 | 2 | 1 | 1 | 2 | 3 | 3 | 1 | 1 | 3 |
| Comparison: no finish | 5 | 5 | 5 | 5 | Comparison: no finish | 5 | 5 | 5 | 5 |
| With a commercially available silicone softener based on polymethyl siloxane | In comparison with agents 1–3, the fiber substrates are indeed somewhat smoother, but have a significantly lower fullness of handle (impoverished handle). | | | | With a commercially available silicone softener based on polymethylsiloxane | As a result of the poor exhaustion capacity from a long liquor on cellulose, polyamide and polyester/wool, substantially less fullness of hand is found in comparison with agents 1–3. | | | |

EXAMPLE 6

(increase in the degree of whiteness)

Various fiber substrates were finished, dried and placed under climatically controlled conditions using the agents according to the invention in accordance with the statements of Example 5 using the padding method with a liquor pick-up of 70%, drying at 100° C. and the application amounts given below. The degree of whitness was determined on the treated test pieces by the Berger method.

The degree of whiteness is compared with that of the particular substrate, in each case finished with a commercially available optical brightener based on stilbene derivatives, with and without addition of the finishing agent according to the invention.

A comparison with a commercially available softener based on a fatty acid amide and corresponding to the prior art is also recorded:

| | | Berger degree of whiteness |
|---|---|---|
| (A) Cellulose fibers | | |
| 1. | Treated with 6 g/liter of optical brightener | 147.0 |
| 2. | With 6/g/liter of optical brightener + 25 g/liter of finishing agent according to Example 1 (= 25% dry weight) | 152.0 |
| 3. | With 6 g/liter of optical brightener + 25 g/liter of a commercially available finishing agent based on a fatty acid amide (25% dry weight) | 140.0 |
| (B) Polyamide | | |
| 1. | Treated with 20 g/liter of optical brightener | 116.2 |
| 2. | With 20 g/liter of optical brightener + 25 g/liter of finishing agent according to Example 1 | 122.7 |
| 3. | With 20 g/liter of optical brightener + 25 g/liter of a commercially available finishing agent based on a fatty acid (25% dry weight) | 114.0 |
| (C) Polyester | | |
| 1. | Treated with 10 g/liter of optical brightener | 111.5 |
| 2. | Treated with 10 g/liter of optical brightener + 25 g/liter of finishing agent according to Example 1 | 117.5 |
| 3. | With 10 g/liter of optical brightener + 25 g/liter of a commercially available finishing agent based on a fatty acid amide (25% dry weight) | 109 |

EXAMPLE 6

(sewability)

The fiber substrates examined were finished, dried and placed under climatically controlled conditions using the treatment agents according to the invention in accordance with the statements of Example 5, from a long liquor (1:30), pH value 4–6, with a treatment time of 15–20 minutes at a liquor temperature of 20°–40° C. To determine the sewability properties, the test pieces were sewn with a sewing machine without sewing thread. The puncture force and needle temperature thereby measured serves as a measure of the sewing properties of the finished textile material.

| Sewing machine: | SINGER make, Type 770 Di |
|---|---|
| Speed: | 5,150 punctures/minute |
| Sewing needle: | Singer 1901/90 |
| Test piece: | 4 layers |
| Test length: | 1 meter |

The numerical values given are average values from in each case 10 individual measurements.

| | | Puncture force (kp) | Needle temperature (°C.) |
|---|---|---|---|
| (A) Cellulose fibers | | | |
| 1. | Goods only dyed | 1.00 | 291 |
| 2. | +3% of a commercially available softening agent based on a fatty acid amide (25% dry weight) | 0.75 | 269 |
| 3. | +3% of finishing agent according to Example 1 | 0.50 | 178 |
| 4. | +3% of finishing agent | 0.70 | 198 |

-continued

|   | | Puncture force (kp) | Needle temperature (°C.) |
|---|---|---|---|
|   | according to Example 2 | | |
| 5. | +3% of finishing agent according to Example 3 | 0.60 | 170 |
| (B) Wool/polyester (35:65) | | | |
| 1. | Goods only dyed | 1.10 | 260 |
| 2. | +3% of a commercially available softening agent based on a fatty acid amide (25% dry weight) | 0.85 | 250 |
| 3. | +3% of finishing agent according to Example 1 | 0.31 | 170 |
| 4. | +3% of finishing agent according to Example 2 | 0.30 | 170 |
| 5. | +3% of finishing agent according to Example 3 | 0.26 | 170 |

EXAMPLE 7

(antielectrostatic properties)

The fiber substrate examined was finished and dried with the treatment agents according to the invention in accordance with the statements of Example 5, using the paddng method with in each case 10 g/liter of the finishing agent and a liquor pick-up of 80%, and was placed under climatically controlled conditions at 23° C. and 45% relative atmospheric humidity.

After the drying and placing under climatically controlled conditions, the antielectrostatic properties were determined by measuring the surface resistance on each of 2 textile samples in accordance with DIN 54,345, Sheet 1, and determining the charging by friction in accordance with DIN 53,486.

As a comparison, the finishes provided using a commercially available softener based on a fatty acid amide or a commercially available softener based on silicone, in the same manner and with the same amounts, were measured.

| Textile samples | Surface resistance $R_{OA}$ [Ω] | Rubbing agent Fabric of | Final charge $\frac{kV}{m}$ | Number of rubbing operations | Half life $t_n$ [seconds] |
|---|---|---|---|---|---|
| 1. Goods only dyed | $2.10^{13}$ | PA | −340 | 50 | 600 |
|  | $2.10^{13}$ | PAC | −640 | 50 | 600 |
| 2. Agent according to the invention, from Example 1 | $7.10^{10}$ | PA | 2 | 10 | 1 |
|  | $6.10^{10}$ | PAC | 3 | 10 | 2 |
| 3. Agent according to the invention, from Example 2 | $2.10^{10}$ | PA | 2 | 10 | 1 |
|  | $2.10^{10}$ | PAC | 2 | 10 | 1 |
| 4. Agent according to the invention, from Example 3 | $7.10^{10}$ | PA | −3 | 50 | 2 |
|  | $6.10^{10}$ | PAC | 4 | 25 | 2 |
| 5. Commerically available fatty acid amide softener | $3.10^{12}$ | PA | 200 | 30 | 400 |
|  | $1.10^{12}$ | PAC | 150 | 30 | 400 |
| 6. Commerically available silicone- | $>10^{13}$ | PA | 2 | 10 | 1 |
|  | $>10^{13}$ | PAC | 3 | 10 | 1 |

*PA = polyamide
PAC = polyacrylate

EXAMPLE 8

(constancy of fastness)

The fiber substrate examined was finished in accordance with the statements of Example 5, using the padding method with 10 g/liter of the finishing agent (25% dry weight) and a liquor pick-up of 80%, and was dried at 100° C., fixed at 170° C. for 30 seconds and then placed under climatically controlled conditions. Evaluation was carried out by a comparison method by means of the grey scale in accordance with DIN 54,002, rating being from 1 to 5.

| Rating 5: no influence on color fastness Rating 1: significant influence on color fastness | | Rating |
|---|---|---|
| (A) | Dyeing on polyester with a commercially available disperse dyestuff and reductive after-treatment, without an additional finishing agent | 4–5 |
| (B) | Dyeing on polyester as under A) and reductive after-treatment, + 10 g/liter of softening agent based on a fatty acid amide (25% dry weight) | 2–3 |
| (C) | Dyeing on polyester as under A) and reductive after-treatment, + 10 g/liter of a finishing agent according to the invention from Example 1 | 3–4 |

EXAMPLE 9

(absorbency)

The test material examined (pre-cleaned woven wool fabric) was finished, dried and placed under climatically controlled conditions (at 23° C. and 65% relative atmospheric humidity) in accordance with the statements of Example 5, using the padding method with a liquor pickup of 80%.

Thereafter, the rate of absorption was determined by the height of ascent principle in accordance with DIN 53,924. The height of ascent of the test liquid in the substrate after various intervals of time is a measure of the rate of absorption.

|   |   | Height of ascent after 2 minutes (mm) | Height of ascent after 5 minutes (mm) |
|---|---|---|---|
| (A) | Pre-cleaned goods, untreated | 0 | 0 |
| (B) | Pre-cleaned goods, treated with 20 g/liter of commercially available softener based on a fatty acid amide/ ethylene oxide adduct (25% dry weight) | 0 | 0 |

|  | | Height of ascent after 2 minutes (mm) | Height of ascent after 5 minutes (mm) |
|---|---|---|---|
| (C) | Pre-cleaned goods, treated with 20 g/ of agent according to the invention, from Example 1 | 45 | 55 |

EXAMPLE 10

(stabilization to heat)

The test material examined (cotton mesh grey goods) was bleached and then rinsed hot and cold. Various samples of the goods thus treated were then treated as follows:

(A) Whitening with a commercially available stilbene derivative by the exhaustion method at pH 6 (15'/40° C.), pre-drying at 80° C. for 10 minutes.

(B) Whitening with a commercially available stilbene derivative, with simultaneous addition of 3% of a commercially available fatty acid amide 20-ethoxylate softener (25% dry weight), by the exhaustion method at pH 6 (15'/40° C.), pre-drying at 80° C. for 10 minutes.

(C) Whitening with a commercially available stilbene derivative, with simultaneous addition of 3% of the treatment agent according to the invention from Example 1, by the exhaustion method at pH 6 (15'/40° C.), pre-drying at 80° C. for 10 minutes.

After being subsequently placed under climatically controlled conditions, the samples were after-dried at various temperatures and the Berger degree of whiteness was measured.

| After-treatment temperature | Berger degree of whiteness | | |
|---|---|---|---|
|  | A | B | C |
| Not after-dried | 149.9 | 144.3 | 146.5 |
| After-dried 30"/120° C. | 145.5 | 140.1 | 144.3 |
| After-dried 30"/140° C. | 140.2 | 135.7 | 144.5 |
| After-dried 30"/160° C. | 135.0 | 135.5 | 145.5 |

We claim:

1. An aqueous dispersion by weight approximately consisting essentially of (A) 1–30 parts by weight of a polyether-siloxane, crosslinked via alkylenoxy bridges, of the general formula

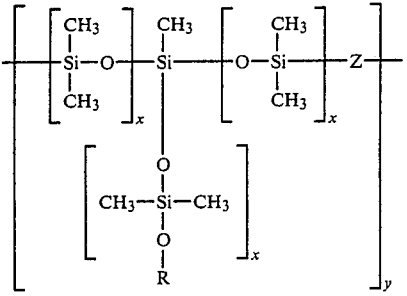

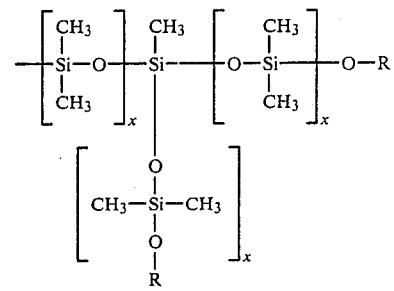

in which
Z is an oxyalkyleneoxy radical with 2–8 C atoms,
R is an alkyl-terminated polyether radical,
x is an interger between 2 and 25, and
y is an integer between 1 and 9, (B) 1–40 parts of a high-molecular polyethylene with an average molecular weight of above 15,000–50,000,
(C) 1–10 parts of an anionic emulsifier,
(D) 0–15 parts of a non-ionic emulsifier, and
(e) 2–97 parts of water.

2. A dispersion according to claim 1, in which
Z is oxybutylenoxy,
R is a radical of the formula $C_mH_{2m+1}(C_2H_4O)_x(C_3H_7O)_Y$,
m is 1–12,
x is 0–40, and
Y is 5–40.

3. A dispersion according to claim 2, wherein
A is present in about 5–15 parts, and
B is present in about 5–20 parts 4. A process for the preparation of an aqueous dispersion according to claim 1 comprising first forming a mixture comprising about 8–90% by weight of the crosslinked polyether-siloxane, 0.1–18% by weight of anionic emulsifier, 0–27% of a non-ionic emulsifier and 1–92% by weight of water, and adding the mixture to an aqueous polyethylene dispersion comprising about 5–40% by weight of polyethylene, 1–10% by weight of anionic emulsifier, and 0–15% by weight of non-ionic emulsifier.

5. A process for preparation of an aqueous dispersion according to claim 1, comprising first forming an emulsion comprising about 8–90% by weight of the crosslinked polyether-siloxane, 0.1–18% by weight of anionic emulsifier, 0–27% of non-ionic emulsifier and 1–92% of water, and mixing the emulsion with an aqueous polyethylene dispersion comprising about 5–40% by weight of polyethylene, 1–10% by weight of anionic emulsifier, and 0–15% by weight of non-ionic emulsifier.

6. In the finishing of a textile fabric by applying thereto a composition to improve its properties, the improvement which comprises employing as said composition an aqueous dispersion according to claim 1, and drying.

* * * * *